J. J. COLEMAN.
Refrigerating Apparatus.
No. 226,281.  Patented April 6, 1880.
2 Sheets—Sheet 1.
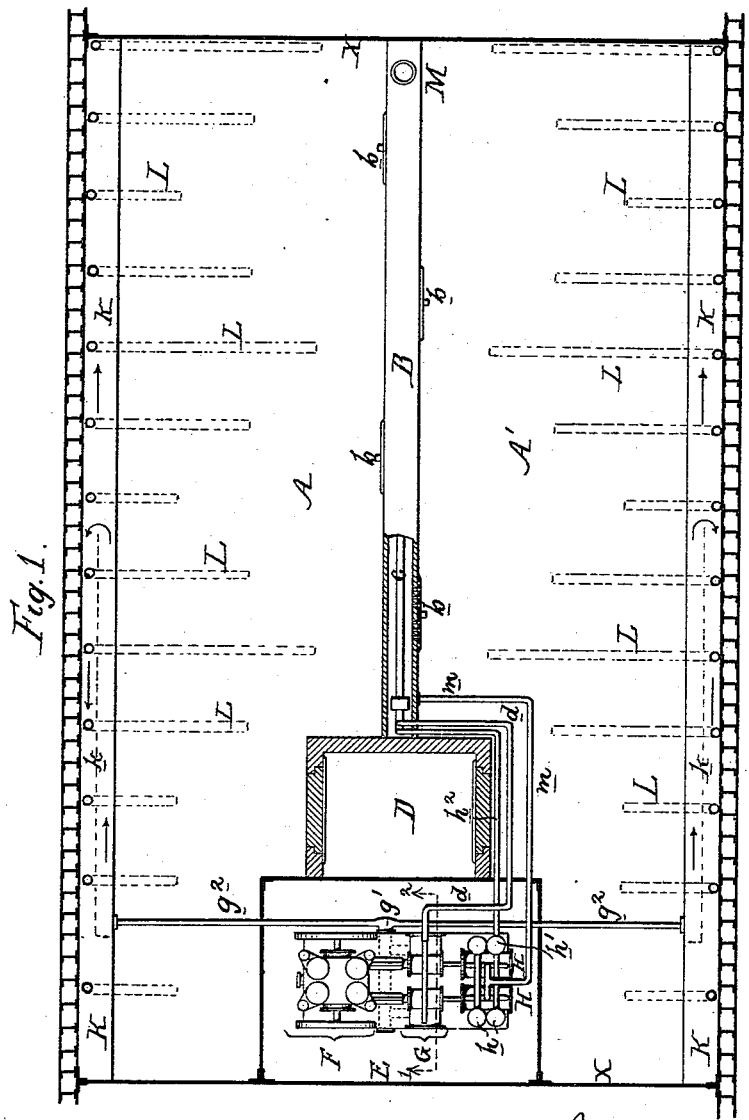

2 Sheets—Sheet 2.
J. J. COLEMAN.
Refrigerating Apparatus.
No. 226,281.  Patented April 6, 1880.
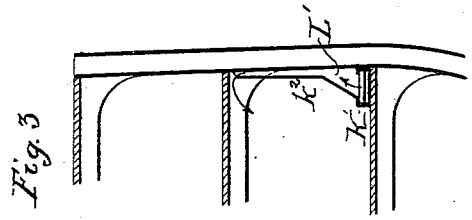
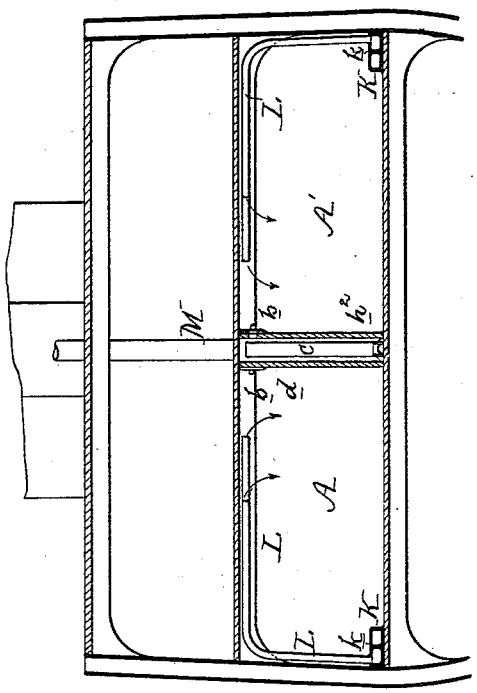
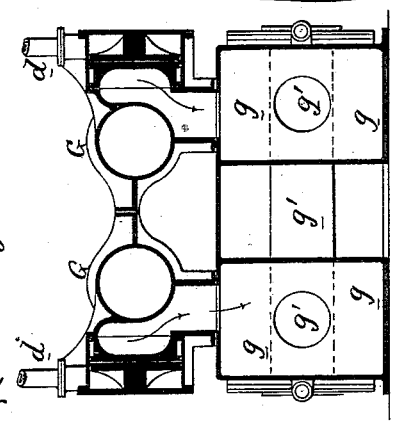
Witnesses
Henry Howson Jr
Harry Smith
Inventor
Joseph James Coleman
by his Attorneys
Howson and Son

UNITED STATES PATENT OFFICE.

JOSEPH J. COLEMAN, OF GLASGOW, SCOTLAND.

REFRIGERATING APPARATUS.

SPECIFICATION forming part of Letters Patent No. 226,281, dated April 6, 1880.

Application filed May 19, 1879.

*To all whom it may concern:*

Be it known that I, JOSEPH J. COLEMAN, of Glasgow, Scotland, have invented new and useful Improvements in Air-Cooling and Refrigerating Apparatus, of which the following is a specification.

My invention relates more particularly to that class of refrigerating apparatus in which the refrigerating effect is produced by the compression and expansion of air, such, for instance, as the apparatus described in the United States Patent No. 202,509, granted to H. and J. Bell and myself April 16, 1878.

The object of my invention is to so construct an apparatus of this character that the air injected into the refrigerating-chamber shall be thoroughly cooled and dried and evenly distributed throughout the chamber, and that the distributing-pipes shall not be choked up by snow formed by the freezing of the moisture in the air.

In the accompanying drawings, Figure 1, Sheet 1, is a sectional plan of a portion of a vessel with my improvements; Fig. 2, Sheet 2, a vertical transverse section of the same; Fig. 3, a sectional view of a modified form of air-distributing conduits; and Fig. 4, an enlarged sectional view on the line 1 2, Fig. 1.

The refrigerating-chamber is in the present instance arranged between the decks of the vessel for the reception of the meat or other provisions to be preserved, and extends from one side of the vessel to the other, being closed at the ends by transverse bulk-heads X X. The chamber is divided into two compartments by a longitudinal double partition or casing, B, and by the hatchway D and the walls of the engine-room E.

H H represent two horizontal double-acting air-compressing cylinders, the piston-rods of which are connected to the pistons of the horizontal expansion-cylinders G G, driven by a steam-engine, F, of any suitable construction, the latter, together with the compression and expansion cylinders, being preferably mounted on one bed-plate.

When the apparatus is in operation the compressed air from the cylinders H passes up through vertical cylindrical vessels $h$, Fig. 1, in which it is subjected to the cooling action of sprays of cold water, and thence the compressed and cooled air passes to similar vertical cylindrical vessels $h'$, where it is deprived of most of its moisture by passing in contact with a series of perforated plates, as described in the above-mentioned patent. The cooled and partially-dried compressed air then passes through a pipe, $h^2$, to a second drying device, C, arranged in the casing B, and composed preferably of a number of horizontal or inclined tubes connected at opposite ends by vertical casings. The air in its passage through these tubes is deprived of its remaining moisture and passes through the pipe $d$ to the expansion-cylinders G in a thoroughly-dried condition.

The expanded air from the exhaust-ports of the cylinders G enters chambers $g$, arranged immediately below said cylinders, as shown in Fig. 4, so that any moisture which may remain in the air will, on the expansion of the latter, be converted into snow and deposited in said chambers $g$. The expanded air thence passes into the main pipe $g'$, which is of such a size that any snow deposited therein will not be sufficient to obstruct the passage of the air. This main pipe communicates, through branch pipes $g^2\ g^2$, with casings or ducts K, which may be arranged along each side of the refrigerating-chamber, Fig. 2.

From the point where the pipes $g^2$ communicate with the casings vertical partitions $k$ are arranged in these casings and extend nearly to the middle of the chamber, as shown by dotted lines in Fig. 1, so that the air on entering is compelled to pass to the centers of the casings and thence spread in opposite directions, as indicated by the arrows, before it can pass up through the series of vertical pipes L, the object of this being to obtain an equal distribution of the air. The pipes L extend up the sides of the chamber, and thence horizontally along the beams, as shown in Fig. 2, the air escaping from the open ends of the pipes, which are of different lengths in order to equalize the distribution of the cold dry air throughout the refrigerating-chamber.

The opposite sides of the casings B are provided with a number of valved openings, $b\ b$, through which the air from the refrigerating-chamber may enter the casing and come into contact with the air-drying pipes C, so that the compressed air in passing through these pipes may be further cooled by the cold air of the refrigerating-chamber before the said compressed air passes into the expansion-cylinders, where its rarefaction produces the required degree of cold, as described in the above-mentioned patent granted to H. and J. Bell and myself.

The air from the refrigerating-chamber passes from the interior of the casing B, through the pipe m, back to the compressing-cylinders H H, so that the same air may be used over and over again; but in almost all cases it is necessary to admit more or less fresh air, and this may be done, in the present instance, through the medium of a pipe, M, in communication with the atmosphere and with the interior of the casing B, as shown in Figs. 1 and 2, the proportion of fresh air admitted being regulated by means of a suitable valve.

Instead of having a series of pipes, L, to distribute the air into the refrigerating-chamber, each casing K may be provided with a horizontal partition, $k'$, Fig. 3, corresponding with the partition $k$, arranged to communicate through a series of openings with an open space, L', formed by a longitudinal inclined partition, $k^2$, over the top of which the air flows into the compartment.

Although I have shown my improvements as applied to a vessel, it will be understood that they can readily be applied to structures of different kinds without departing from my invention.

I claim as my invention—

1. The combination of a refrigerating-chamber with air-pipes $g^2$, a casing, K, in said chamber provided with a partition, $k$, and pipes or conduits leading from said casing and having their outlets near the roof, substantially as described.

2. The combination of a refrigerating-chamber with air-pipes $g^2$, a casing, K, in said chamber provided with a partition, $k$, and open-ended pipes L, of different lengths, along the roof, all substantially as set forth.

3. The combination of the exhaust-port of an air-expansion cylinder with snow-chambers $g$, immediately below said port, substantially as specified.

4. The combination of air-expansion cylinders G with snow-chambers $g$ and pipe $g'$, as and for the purpose set forth.

5. The combination of a refrigerating-chamber and a casing, B, forming a partition between the two parts thereof and having openings into said chambers, with a pipe, $m$, compression and expansion cylinders, and drying-pipes C within said casing, as set forth.

In testimony whereof I have signed my name to this specification in the presence of two subscribing witnesses.

JOSEPH JAMES COLEMAN.

Witnesses:
　WILLIAM J. COOPER,
　HARRY SMITH.